US008324538B2

(12) United States Patent
Schwerman

(10) Patent No.: US 8,324,538 B2
(45) Date of Patent: Dec. 4, 2012

(54) SYSTEMS AND METHODS FOR LIMITING INPUT POWER AND RMS INPUT CURRENT DRAWN FROM A DC POWER SOURCE

(75) Inventor: Paul Schwerman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 681 days.

(21) Appl. No.: 12/616,083

(22) Filed: Nov. 10, 2009

(65) Prior Publication Data

US 2011/0109293 A1  May 12, 2011

(51) Int. Cl.
G05F 1/10 (2006.01)
H05B 1/02 (2006.01)
(52) U.S. Cl. .................... 219/490; 219/509; 323/284
(58) Field of Classification Search .................. None
See application file for complete search history.

(56) References Cited

U.S. PATENT DOCUMENTS

| 3,676,698 | A | 7/1972 | Hunter |
| 3,745,373 | A | 7/1973 | Jones et al. |
| 4,007,425 | A | 2/1977 | Salisbury |
| 4,230,970 | A | 10/1980 | Potter et al. |
| 4,954,676 | A * | 9/1990 | Rankin .................. 219/200 |
| 5,859,506 | A | 1/1999 | Lemke |
| 6,411,072 | B1 * | 6/2002 | Feldman .................. 323/299 |
| 2005/0167418 | A1 | 8/2005 | Ferre Fabregas et al. |
| 2005/0180179 | A1 * | 8/2005 | Hirst .................. 363/21.07 |
| 2007/0170902 | A1 | 7/2007 | Chen et al. |
| 2007/0262801 | A1 | 11/2007 | Renaud et al. |
| 2008/0165830 | A1 | 7/2008 | Tai |
| 2008/0234875 | A1 * | 9/2008 | Nomura .................. 700/300 |
| 2010/0033261 | A1 | 2/2010 | Stevenson et al. |
| 2011/0174801 | A1 | 7/2011 | Schwerman |

FOREIGN PATENT DOCUMENTS

WO  2005052713  6/2005

OTHER PUBLICATIONS

Schwerman, "Systems and Methods for Sourcing a Heater", "U.S. Appl. No. 12/368,780", filed Feb. 10, 2009.
U.S. Patent and Trademark Office, "Office Action", "U.S. Appl. No. 12/368,780", Jun. 5, 2012.
European Patent Office, "Office Action" from Foreign Counterpart of U.S. Appl. No. 12/368,780, mailed Jun. 18, 2010, Published in: EP.
European Patent Office, "European Search Report" from Foreign Counterpart of U.S. Appl. No. 12/368,780, mailed Jun. 1, 2010, Published in: EP.

* cited by examiner

*Primary Examiner* — Hoai V Ho
*Assistant Examiner* — James G Norman
(74) *Attorney, Agent, or Firm* — Fogg & Powers LLC

(57) ABSTRACT

Systems and methods to source a resistive load, such as a heating resistor, to control temperature while adhering to a specified power draw budget and/or a specified root mean square (RMS) current limit. For example, a sensor block assembly (SBA) heater controls temperature of a MEMS device in a sensor block assembly while adhering to the power draw budget and/or an average current limit. An exemplary embodiment generates a pulse width modulation (PWM) control signal, controls a switch in accordance with the control signal, sources the resistive load from a power source in accordance with the controlled switch, and modifies the duty factor of the switch to reduce the power drawn by the resistive load in response to the power drawn by the resistive load exceeding a power limit defined by a slope-intercept curve. The limiting of power into a resistor load limits the RMS current drawn by that load.

19 Claims, 4 Drawing Sheets

SYSTEMS AND METHODS FOR LIMITING INPUT POWER AND RMS INPUT CURRENT DRAWN FROM A DC POWER SOURCE

GOVERNMENT INTEREST

The present invention was made with support from the United States Government under contract number C-3009, Lockheed Martin Space Systems Company. The United States Government may have certain rights in the invention.

BACKGROUND OF THE INVENTION

A Micro-Electro-Mechanical Systems (MEMS) device is typically enclosed in a sensor block assembly (SBA) to facilitate mounting of the MEMS device in its application device. For example, a MEMS gyroscope or accelerometer may be used to determine angular rotation or acceleration, respectively, of the installation vehicle in which it is installed.

The MEMS device may be subject to severe temperature excursions when the application device is operating in the field. For example, if the application device is a satellite or space craft, the satellite or space craft will be subjected to extreme temperature variations.

To prevent the MEMS device from exposure to cold temperatures, a heater may be physically coupled to, or implemented within, the sensor block assembly. As temperature of the application device decreases, the heater will operate to maintain temperature of the MEMS device within a predefined temperature threshold. The temperature control system of the heater relies on an external power source, such as a battery.

Various design considerations may, at times, impose limits on the amount of power and/or current that may be drawn by the heater. For example, if the power source is a battery, the total deliverable power deliverable from the battery may be limited based upon some criteria, such as a designed operating period between battery charging. Accordingly, a power budget may be allocated to an individual heater so that at any given time, the power draw from that heater is limited to a specified power budget.

Further, design considerations may limit the amount of root mean square (RMS) current drawn by the heater. Since a heater is typically a resistive device, the generated heat will decrease as the power supply voltage decreases. To compensate, a pulse width modulation (PWM) controller may increase the duty factor, and thus increase input current, to maintain a constant delivered power. However, at some point, a specified RMS current limit may be reached and thus limit the power to the resistive load.

Accordingly, it is desirable to improve the ability of the heater control system to respond to changes in operating temperature by closely adhering to a specified power draw budget and/or a specified current limit independent of the power source voltage and independent of any average current limit.

SUMMARY OF THE INVENTION

Systems and methods of sourcing a resistive load while adhering to a specified power draw budget and/or a specified root mean square (RMS) current limit are disclosed. An exemplary embodiment generates a pulse width modulation (PWM) control signal, controls a switch in accordance with the control signal, sources the resistive load from a power source in accordance with the controlling of the switch, and modifies a duty factor of the switch to reduce the power drawn by the resistive load to the power limit in response to a power drawn by the resistive load exceeding a power limit defined by a slope-intercept curve.

In accordance with further aspects, an exemplary embodiment includes a resistive load, a switch coupled between a power source and the resistive load, and a power limiter coupled to the PWM controller. The switch sources the resistive load at an input voltage from the power source. Power is defined by the input voltage provided to the resistive load, the duty factor of the switch, as set by the PWM controller, and a current drawn by the resistive load. The PWM controller generates a control signal to control the duty factor of the switch. The power limiter adjusts the control signal in response to the power drawn by the resistive load exceeding a power limit defined by a slope-intercept curve, wherein the duty factor of the switch is modified by the PWM controller to limit the power drawn by the resistive load in response to the power limit.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
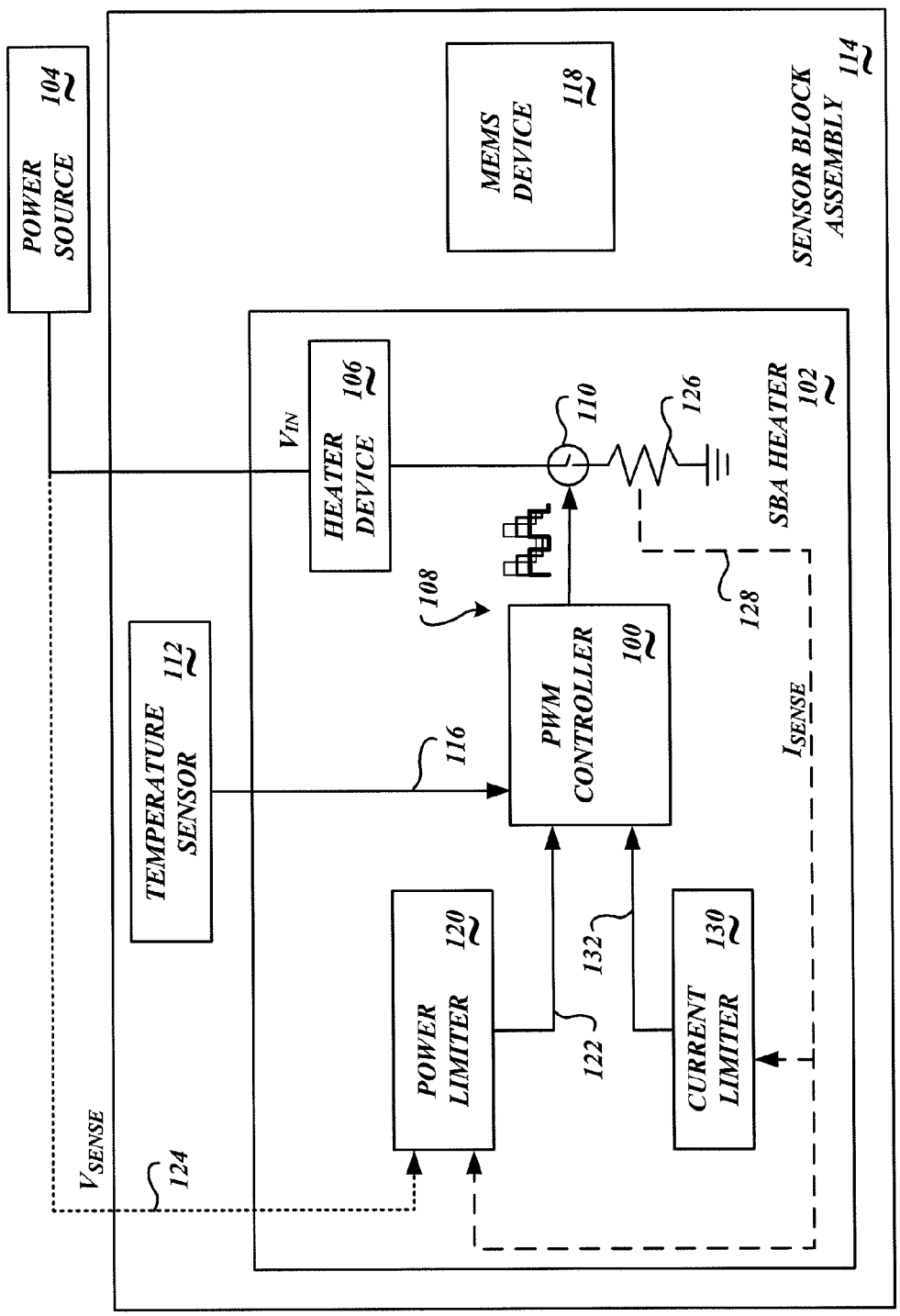
FIG. 1 is a block diagram of an embodiment of a pulse width modulation (PWM) controller in a sensor block assembly (SBA) heater.

FIG. 1 is a block diagram of an embodiment of a pulse width modulation (PWM) controller 100 in a sensor block assembly (SBA) heater 102. Embodiments are operable to source a resistive load, such as, but not limited to, the exemplary SBA heater 102.

An exemplary embodiment of the PWM controller 100, for a given demand level, controls the duty factor of power received from a power source 104. Power is delivered to a heater device 106 in the SBA heater 102 by using a control signal 108 to control a duty factor of a switch 110 coupled to the heater device 106. The control signal 108 operates the switch 110, thereby providing power to the heater device 106 at a duty factor of the switch 110 corresponding to the lower of system demand, demand of an average current limit and demand of a power limit. Accordingly, for a given power limit, embodiments of the PWM controller 100 controls the duty factor to limit the amount of power to the heater device 106 as the input voltage ($V_{IN}$) supplied from the power source 104 varies.

A temperature sensor 112 senses temperature of a sensor block assembly 114. When the sensed temperature is less than a predefined temperature threshold, the temperature sensor 112 provides a demand signal, via connection 116, such that the PWM controller 100 is enabled to control the switch 110. Accordingly, the PWM controller 100 controls temperature of a Micro-Electro-Mechanical Systems (MEMS) device 118 residing in the sensor block assembly 114.

During some operating condition, such as, but not limited to, at cold temperatures and/or at start up, the temperature sensor can "request" more power from the power source 104 than is desirable. Embodiments of the PWM controller 100, when under control of a power limiter 120, prevent this undesirable condition by limiting the input power. The specified power budget is enforced by the power limiter 120 which provides a power limit signal, on connection 122, to the PWM controller 100. The amount of power drawn by the heater device 106 is determined from the sensed voltage ($V_{SENSE}$) and the sensed current ($I_{SENSE}$). $V_{SENSE}$ corresponds to the input voltage ($V_{IN}$) supplied from the power source 104 and is provided to the power limiter 120 via a connection 124. $I_{SENSE}$ corresponds to the current supplied to the heater device 106 from the power source 104. In an exemplary embodiment, $I_{SENSE}$ may be provided from a current sensing resistor 126, via connection 128. At relatively high source voltages, the allowed amount of drawn current is relatively small. However, at these relatively high source voltages, power drawn by an uncontrolled heater device 106 might increase above the power budget. Accordingly, the power limiter 120 becomes operable to limit the duty factor of the switch 110, thereby limiting the input power to the heater device 106.

The specified average current limit is enforced by a current limiter 130 which provides an average current limit signal, on connection 132, to the PWM controller 100. The amount of current drawn by the SBA heater 102 is determined from the sensed current ($I_{SENSE}$). As the source voltage decreases, the current drawn by the heater device 106 will increase to maintain the power drawn by the heater device 106. The current is increased by increasing the duty factor of the switch 110. However, at some point, the requested current may become larger than the specified average current limit, independently of the power limit. Accordingly, the current limiter 130 becomes operable to limit the duty factor of the switch 110, thereby limiting average current to the heater device 106.

Any suitable current limiter circuitry may be used in the current limiter 130. Further, the exemplary current sensing resistor 126 was illustrated to conceptually indicate one possible means of sensing current drawn by the heater device 106. The current sensing resistor 126 may reside elsewhere in alternative embodiments. Other embodiments may use other devices or circuitry to sense the current.

Figure 2:
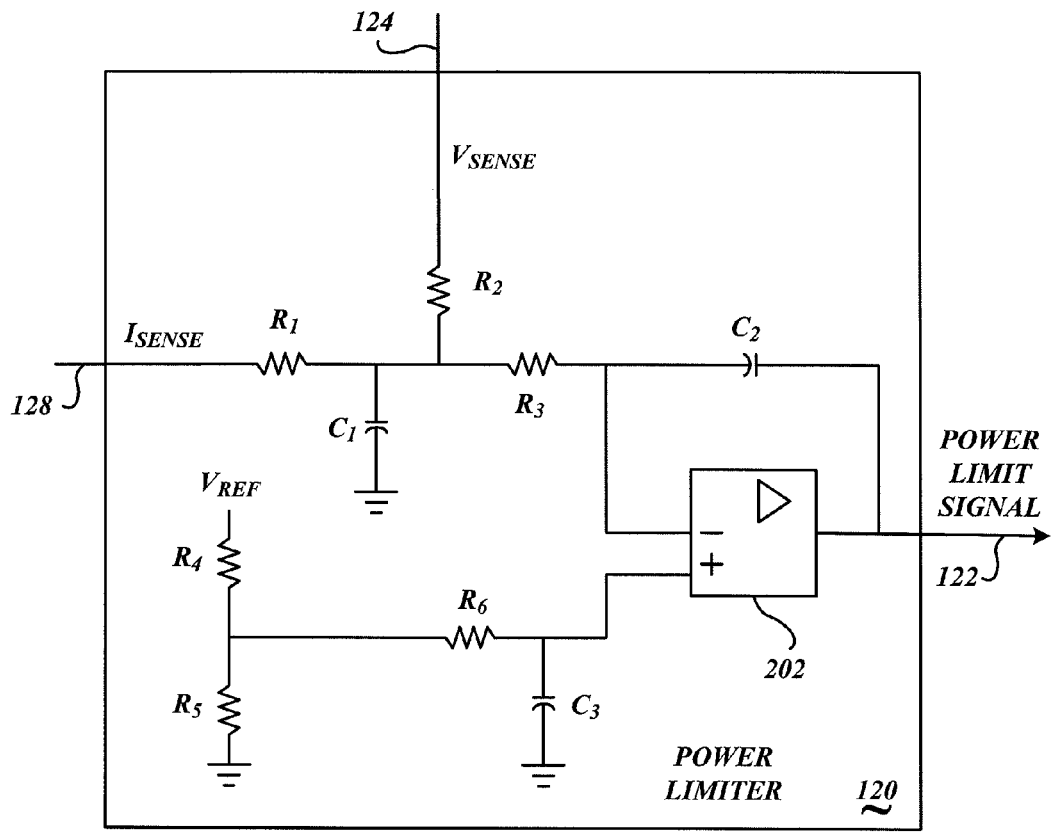
FIG. 2 is a block diagram of an embodiment of an exemplary power limiter circuit.

FIG. 2 is a block diagram of an exemplary embodiment of the power limiter 120. The exemplary embodiment includes a plurality of resistors $R_1$-$R_6$, a plurality of capacitors $C_1$-$C_3$, and an amplifier 202. It is appreciated that the illustrated components may be implemented using a plurality of like serially-connected and/or parallel-connected components. Further, the illustrated components may be arranged differently in the power limiter 120. Also, other components (not shown) may be included in the power limiter 120. For example, optional filtering components and the like are not illustrated in the exemplary embodiment of the power limiter 120 for brevity.

Figure 3:
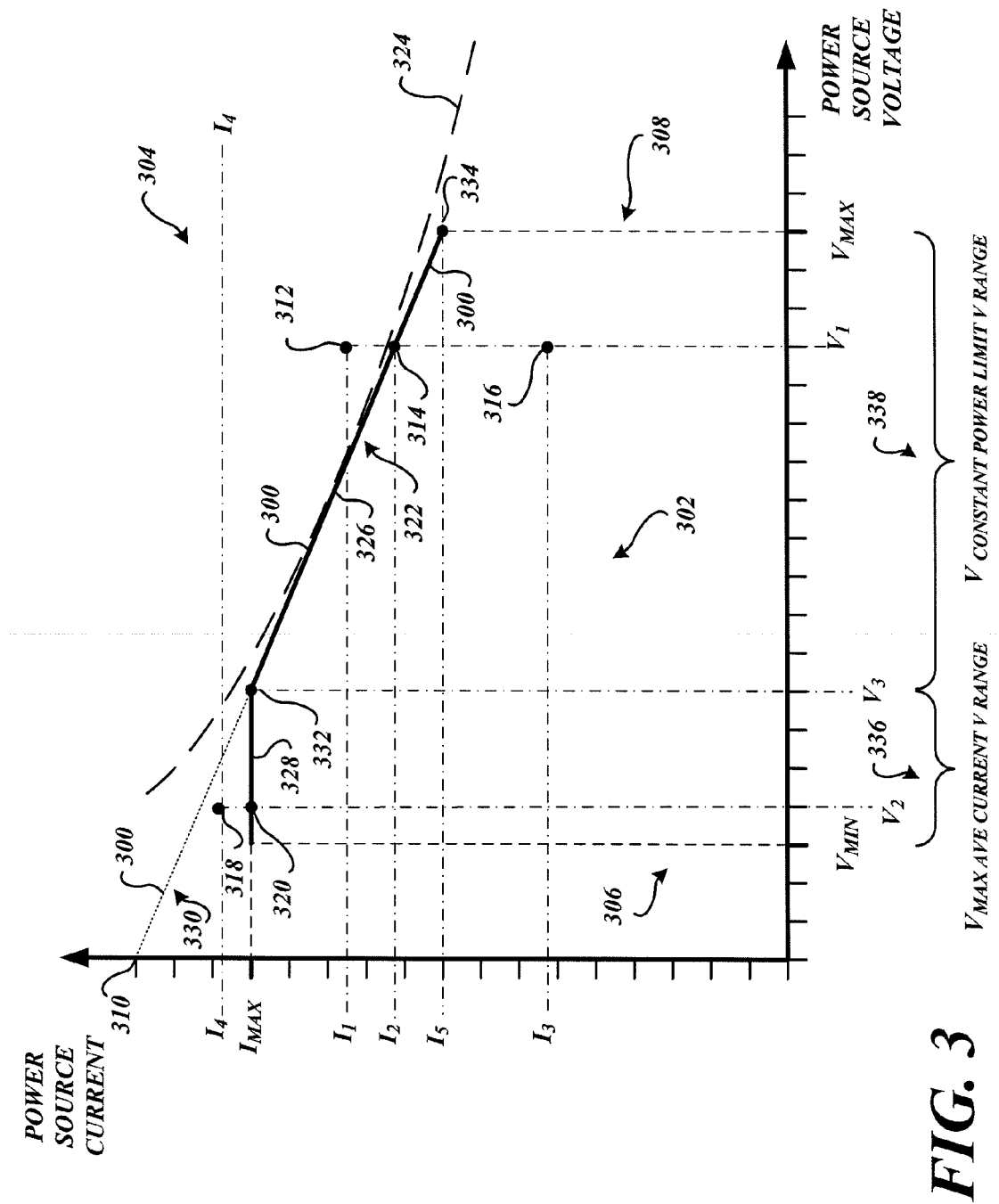
FIG. 3 illustrates a slope-intercept curve defining a permitted power operating range of the PWM controller.

FIG. 3 illustrates a slope-intercept curve 300 defining a permitted power operating range 302 of the PWM controller 100. The power operating range 302, illustrated in a current-voltage plot 304, extends from a minimum voltage (VMIN) to a maximum voltage (VMAX) that is provided by the power source 104. The low voltage of the operating range 302 is denoted by the boundary line 306. The high voltage of the operating range 302 is denoted by the boundary line 308.

The power limiter 120 enforces a power limit for various input voltages across the operating range 302 based upon the slope-intercept curve 300, as illustrated in the current-voltage plot 304. The slope-intercept curve 300 is defined by an intercept point 310 and a slope of the slope-intercept curve 300. The power limiter 120 operates to limit the duty factor of the switch 11, in accordance with the control signal 108, to prevent operation at points above the slope-intercept curve 300.

For example, when voltage provided by the power source 104 is at $V_1$, and an amount of current $I_1$ is otherwise available, the power delivered to the SBA heater 102 is at the operating point 312 (where the power is substantially equal to $I_1$ times $V_1$). Since the SBA heater 102 is substantially a resistive heating element, the power drawn from a dc source can be approximated as the product of the average operating current times the average operating voltage. Here, the operating point 312 is above the slope-intercept curve 300.

Embodiments of the power limiter 120 transmit a power limiting signal to the PWM controller 100 to reduce the duty factor of the switch 110 in accordance with the control signal 108. The duty factor of the switch 110 would be set such that, at the exemplary operating voltage $V_1$, the average current would be limited to $I_2$. Accordingly, the delivered power corresponds to the operating point 314 (where the power is substantially equal to $I_2$ times $V_1$).

If, on the other hand, the demand on the SBA heater 102 was such that power corresponding to the operating point 316 was required, the power limiter 120 would not operate to enforce the power limit. That is, the PWM controller 100 would be permitted to set the duty factor of the switch 110 to deliver the power corresponding to the operating point 316 (where the power is substantially equal to $I_3$ times $V_1$) since this operating point 316 is below the slope-intercept curve 300. It is appreciated that at any operating point within the operating range 302, the PWM controller 100 would be permitted to set the duty factor of the switch 110 to deliver power since such operating points are below the slope-intercept curve 300.

When voltages provided by the power source 104 decrease, a corresponding increase in the duty factor of the switch 110 is required to increase current so as to maintain a demanded power. However, at some point, the current may reach an optional predefined threshold where the current limiter 130 operates to limit average current by controlling the duty factor of the switch 110. The current limiter 130 prevents operation at average currents above $I_{MAX}$.

For example, when voltage provided by the power source 104 is at $V_2$, and sufficient current $I_4$ is otherwise available, the SBA heater 102 could provide power defined by the operating point 318 (where the power is substantially equal to $I_3$ times $V_2$). However, the operating point 318 corresponds to a current that is above the maximum average current $I_{MAX}$.

Embodiments of the current limiter 130 transmit a current limiting signal to the PWM controller 100 to reduce the duty factor of the switch 110, in accordance with the control signal 108, thereby reducing average current. The duty factor of the switch 110 would be set such that, at the exemplary operating voltage $V_2$, the average current would be limited to $I_{MAX}$. Accordingly, the delivered power is limited to the operating point 320 (where the power is substantially equal to $I_{MAX}$ times $V_2$). Operating point 320 enforced by the average current limit limits the power to the resistor to be substantially less than what would be allowed by a constant power curve 324 or a slope-intercept curve 300.

When the power limiter 120 and the current limiter 130 cooperatively act to limit the power and the average current, respectively, an operating curve 322 is defined.

The power limiter 120, by defining the intercept point 310 and the slope of the slope-intercept curve 300, defines a portion 326 of the operating curve 322. The current limiter 130, by defining a maximum current $I_{MAX}$, defines a maximum average current portion 328, referred to as a constant-current voltage range, of the operating curve 322. Since the current along the maximum average current portion 328 of the operating curve 322 is less than currents of a portion 330 of the slope-intercept curve 300, it is appreciated that the portion 330 of the slope-intercept curve 300 is not part of the operating curve 322. Thus, the operating curve 322 can be conceptually viewed as a flat, maximum average current portion 328 and a sloped, constant power limit portion 326 that are joined at a break point 332. The break point 332, or the "knee" of the operating curve 322, corresponds to a transition between control under the power limit imposed by the power limiter 120 and control under the current limit imposed by the average current limiter 130. Accordingly, the sloped portion 326 approximates the portion of the ideal constant power limit curve 324 between the break point voltage $V_3$ and the maximum operating voltage $V_{MAX}$. The break point 332 defines a maximum average current portion 328 over a maximum average current voltage range 336 (from $V_{MIN}$ to the break point voltage), and defines a maximum current portion of 326 over a constant power voltage range 338 (from the break point voltage to $V_{MAX}$). At the maximum operating voltage ($V_{MAX}$), $I_5$ corresponds to an allowed current for a constant power range 338 at the operating point 334.

In alternative embodiments, additional break points may be added to extend the permitted power operating range 302 for higher values of $V_{MAX}$.

In operation of the exemplary embodiment of the power limiter 120 illustrated in FIG. 2, a ratio of the resistance of the resistors $R_1$ and $R_2$ define the slope of the slope-intercept curve 300 (FIG. 3). The resistor $R_3$ and the capacitor $C_2$ define a feedback loop to the amplifier 202.

The resistor $R_4$ is connected to a reference voltage ($V_{REF}$). A ratio of the resistance of the resistors $R_4$ and $R_5$ define a reference voltage divider. The reference voltage divider, a second voltage divider defined by the ratio of $R_1$ and $R_2$, and the reference voltage ($V_{REF}$) set the intercept point 310. The resistor $R_6$ and the capacitor $C_3$ define an optional noise filter and nulls out the input offset current from the resistors $R_4$ and $R_5$.

The resistor $R_1$ and the optional capacitor $C_1$ cooperatively act to filter out transients in the sensed current ($I_{SENSE}$).

In some embodiments, in addition to the constant power, design considerations may specify a total average current that is drawn by the SBA heater 102 (and optionally, the MEMS device 118). In such embodiments, the current load of the SBA heater circuitry (the PWM controller 100, the power limiter 120, the current limiter 130, and/or other components) may be estimated based upon design and/or may be determined by testing. Here, such average current load requirements could be offset from the sensed current ($I_{SENSE}$) to more accurately control average input current than by controlling the resistance of the heater and the wiring resistance to the heater. This offset is implemented by adjusting the location of the break point 332 in the operating curve.

A root mean square (RMS) input current limit may be specified in an alternative embodiment. Since power into the resistive heater load is substantially constant when the power limiter is active, the RMS input current is substantially constant for a given resistive heater load value. The RMS input current is substantially constant because, at a high efficiency operating point, the the input power ($P_{IN}$) is substantially equal to the output power ($P_{IN} \approx P_{OUT} = I_{RMS}^2 * R_{LOAD}$). Accordingly, in embodiments where the heater resistor is directly chopped, when the input power is constant into a constant load resistance, the RMS input current becomes substantially constant when operating in a power limit condition.

Figure 4:
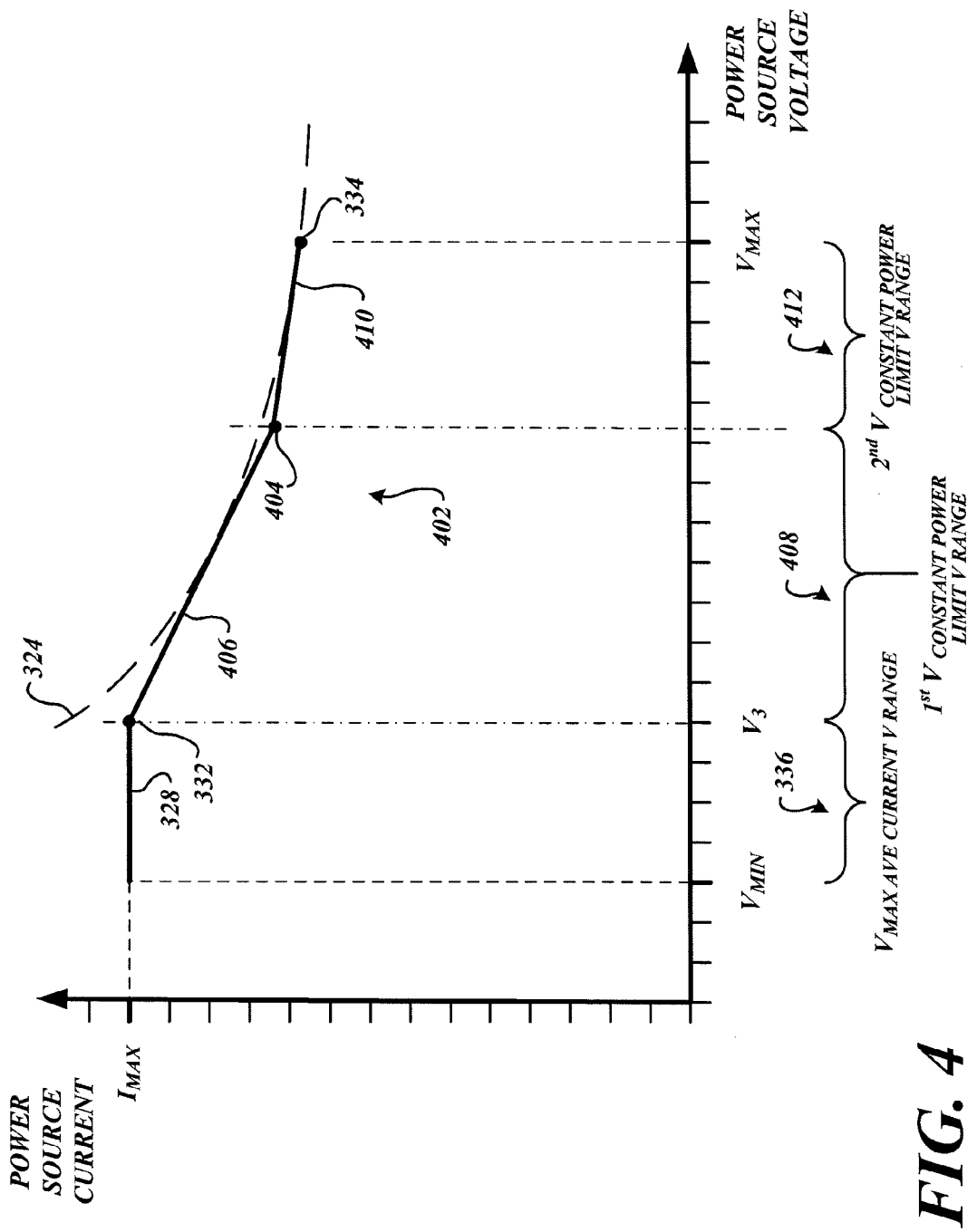
FIG. 4 illustrates an alternative slope-intercept curve with multiple break points.

FIG. 4 illustrates an alternative slope-intercept curve 402, which is a piece-wise linear slope intercept curve with multiple break points 332, 404. The multiple break points 332, 404 more closely define an operating curve 402 of the PWM controller 100 to the ideal constant power limit curve 324. Multiple break points 332, 404 in operating curve 402 may be used to reduce error in the fitting of the operating slope-intercept curve 402 to the desired ideal constant power limit curve 324. Further, multiple break points 332, 404 in the slope-intercept curve 402 may be used to extend the operating voltage range of the PWM controller 100.

The break point 332 defines a maximum current portion 328 over a maximum average current voltage range 336 (from $V_{MIN}$ to a first break point voltage), and defines a first voltage dependent current limit portion 406 over a constant power voltage range 408 (from the first break point voltage to a second break point voltage). The break point 404 defines a second voltage dependent current limit portion 410 over a second a constant power voltage range 412 (from the second break point break point voltage to the maximum voltage $V_{MAX}$)

Figure 5:
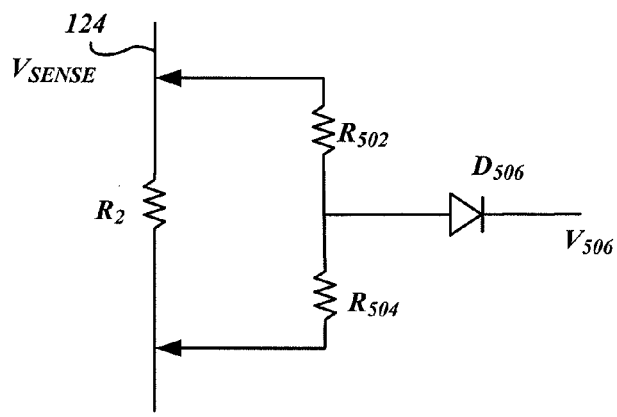
FIG. 5 is a block diagram of an alternative embodiment that provides a plurality of break points to define a permitted power operating range of the PWM controller.

FIG. 5 is a block diagram of an alternative embodiment that provides a an exemplary circuit with additional break points 322, 404. The multiple break point 404 may be defined by the selected values of the resistors $R_{502}$ and $R_{504}$ that are coupled through $D_{506}$ to $V_{506}$. An optional diode may be employed to provide a sensing point to detect the voltage between $R_{502}$ and $R_{504}$ and/or to obtain a control signal.

Various exemplary embodiments above are described as controlling a sensor block assembly (SBA) heater 102. Other embodiments of the PWM controller 100 may be configured to control other devices. For example, a light may be controlled by an alternative embodiment. As another non-limiting example, an embodiment of the PWM controller 100 may control a heater used in a chemical process to control temperature of a chemical or mixture, or control temperature of a component handling the chemical or mixture. In another non-limiting embodiment, a component of a measuring system may be controlled.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for sourcing a resistive load, the method comprising:
   generating a pulse width modulation (PWM) control signal;
   controlling a switch based upon the PWM control signal, wherein the switch sources the resistive load from a power source;
   modifying a duty factor of the switch in response to the PWM control signal to reduce a power drawn by the resistive load to a power limit in response to the power drawn by the resistive load exceeding the power limit defined by a slope-intercept curve;
   providing a first resistor defined by a first resistance with a sensed current corresponding to the current drawn by the resistive load;

providing a second resistor defined by a second resistance with a sensed voltage corresponding to the input voltage from the resistive load; and wherein the slope of the slope-intercept curve is defined by a ratio between the first resistance of the first resistor and the second resistance of the second resistor.

2. The method of claim 1, wherein the slope-intercept curve is defined by a first break point, and wherein the break point defines a voltage dependent current maximum over a predefined voltage range, and wherein the first break point defines a first constant root mean square (RMS) current limit line from a constant-current voltage range.

3. The method of claim 2, wherein the slope-intercept curve is further defined by a second break point, and wherein the first break point and the second break point define the first constant RMS current limit line between the first break point and the second break point, and wherein the second break point defines a second constant RMS current limit line between the second break point and a maximum voltage point.

4. The method of claim 1, wherein modifying the duty factor comprises:
modifying the duty factor to reduce a root mean square (RMS) input current drawn by the resistive load.

5. The method of claim 1, wherein the power drawn by the resistive load corresponds to a product of a sensed voltage from the power source and a sensed current drawn by the resistive load.

6. The method of claim 1, further comprising:
modifying the duty factor of the switch to reduce a current drawn by the resistive load to an average current limit in response to the current drawn by the resistive load exceeding the average current limit.

7. The method of claim 1, further comprising:
sensing a voltage of the power source to identify the sensed voltage; and
sensing a current drawn by the resistive load to identify the sensed current,
wherein power drawn from the resistive load corresponds to the sensed voltage and the sensed current.

8. The method of claim 1, wherein the resistive load is a heater device that is configured to provide heat to a sensor block assembly.

9. The method of claim 1, wherein controlling the switch comprises:
closing the switch to couple the power source to a heating resistor; and
opening the switch to decouple the heating resistor from the power source,
wherein the closing and the opening of the switch is in accordance with the duty factor of the switch.

10. The method in claim 1 wherein the power limit is defined by a plurality of piece-wise linear slope intercept curves.

11. The method of claim 4 wherein to reduce the root mean square (RMS) input current drawn by a resistive load is limited by limiting the power drawn by the resistive load.

12. A sourcing system, comprising:
a resistive load;
a switch coupled between a power source and the resistive load, wherein the switch sources the resistive load at an input voltage from the power source, and wherein a power is defined by the input voltage provided from power source to the resistive load and a current drawn by the resistive load;
a pulse width modulation (PWM) controller coupled to the switch, wherein the PWM controller is configured to generate a control signal to control a duty factor of the switch; and
a power limiter coupled to the PWM controller, wherein the PWM controller adjusts the control signal in response to the power drawn by the resistive load exceeding a power limit defined by a slope-intercept curve, such that the duty factor of the switch is modified to limit the power drawn by the resistive load in response to the power limit wherein the power limiter includes:
a first resistor coupled to a first connection providing a sensed current corresponding to the current drawn by the resistive load, the first resistor defined by a first resistance;
a second resistor coupled to the first resistor and coupled to a second connection providing a sensed voltage corresponding to the input voltage from the resistive load, the second resistor defined by a second resistance; and
wherein a ratio between the first resistance and the second resistance defines the slope of the slope-intercept curve.

13. The sourcing system of claim 12, further comprising:
an amplifier with a first input, a second input, and an output, wherein the first input of the amplifier is coupled to a connection between the first resistor and the second resistor;
a third resistor coupled to a reference voltage; and
a fourth resistor coupled to the third resistor to form a voltage divider,
wherein the second input of the amplifier is coupled to a connection between the third resistor and the forth resistor, and
wherein the reference voltage and a ratio between the third resistance and the fourth resistance define an intercept point of the slope-intercept curve.

14. The sourcing system of claim 12, further comprising:
a third resistor coupled between the first input of the amplifier and the connection between the first resistor and the second resistor; and
a capacitor coupled to the third resistor and the output of the amplifier,
wherein the third resistor and the capacitor define an amplifier feedback loop.

15. The sourcing system of claim 12, further comprising:
a current limiter coupled to the PWM controller and operable to adjust the duty factor of the switch in response to the current drawn by the heater device exceeding an average current limit, wherein the duty factor of the switch is modified by the power limiter to reduce the current drawn by the heater device to the average current limit.

16. The sourcing system of claim 12, wherein the heating device is a linear device, and wherein only power is limited.

17. The sourcing system of claim 16, wherein the heating device is a transistor.

18. A sourcing system, comprising:
means for generating a pulse width modulation (PWM) control signal;
means for controlling a switch in accordance with the PWM control signal to source a resistive load from a power source in accordance with the controlling of the switch;
means for modifying a duty factor of the switch in response to the PWM control signal to reduce a power drawn by the resistive load to a power limit in response to the power drawn by the resistive load exceeding the power limit, wherein the power limit is defined by a slope-intercept curve;

means for providing a first resistor defined by a first resistance with a sensed current corresponding to the current drawn by the resistive load;

means for providing a second resistor defined by a second resistance with a sensed voltage corresponding to the input voltage from the resistive load;

wherein the slope of the slope-intercept curve is defined by a ratio between the first resistance of the first resistor and the second resistance of the second resistor.

19. The system of claim 18, further comprising:

means for modifying the duty factor of the switch to reduce a current drawn by the resistive load to a current limit in response to the current drawn by the resistive load exceeding the current limit.

* * * * *

UNITED STATES PATENT AND TRADEMARK OFFICE
CERTIFICATE OF CORRECTION

| | | |
|---|---|---|
| PATENT NO. | : 8,324,538 B2 | |
| APPLICATION NO. | : 12/616083 | |
| DATED | : December 4, 2012 | |
| INVENTOR(S) | : Schwerman | |

It is certified that error appears in the above-identified patent and that said Letters Patent is hereby corrected as shown below:

In the Specification

In Column 1, Lines 9-10, replace "The United States Government may have certain rights in the invention." with --The United States Government has certain rights in the invention.--

Signed and Sealed this
Eleventh Day of February, 2014

Michelle K. Lee
*Deputy Director of the United States Patent and Trademark Office*